(12) United States Patent
Lee

(10) Patent No.: US 6,335,211 B1
(45) Date of Patent: Jan. 1, 2002

(54) THIN FILM TRANSISTOR ARRAY PANEL FOR A LIQUID CRYSTAL DISPLAY HAVING A WIDE VIEWING ANGLE AND A METHOD FOR MANUFACTURING THE SAME

(75) Inventor: Kyung-Nam Lee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/521,179

(22) Filed: Mar. 8, 2000

(30) Foreign Application Priority Data

May 13, 1999 (KR) .............................. 99-17192

(51) Int. Cl.[7] .............................................. H01L 21/00
(52) U.S. Cl. .......................................... 438/22; 438/30
(58) Field of Search ........................... 438/22, 30, 158, 438/160, 712, 722, 949, 149, 151, 164

(56) References Cited

U.S. PATENT DOCUMENTS

| | | | |
|---|---|---|---|
| 5,821,133 A | * 10/1998 | Kawai et al. | 438/30 |
| 5,825,437 A | * 10/1998 | Seo et al. | 349/46 |
| 5,990,986 A | * 11/1999 | Song et al. | 349/43 |
| 6,022,753 A | * 2/2000 | Park et al. | 438/30 |

* cited by examiner

Primary Examiner—Son L. Mai
Assistant Examiner—Phuc T. Dang

(74) Attorney, Agent, or Firm—Howrey Simon Arnold & White, LLP

(57) ABSTRACT

A gate wire including a gate line, a gate electrode and a gate pad, and a storage wire including a storage line and a storage electrode are formed on an insulating substrate. A gate insulating layer pattern, a semiconductor pattern made of amorphous silicon, and an ohmic contact layer pattern made of a doped amorphous silicon are patterned to have a shape covering the gate wire and the storage wire. Next, a transparent conductive layer made of ITO is deposited and patterned to form a pixel electrode, a redundant gate pad and a redundant data pad. A lower layer made of chromium having good contact properties with ITO and an upper layer made of either aluminum or aluminum alloy having low resistivity are sequentially deposited and patterned to form a data wire including a data line, a source electrode, a drain electrode and a data pad. Next, the ohmic contact layer, which is not covered by the data wire, is etched. After forming the data wire, a passivation layer is formed and patterned to form contact holes respectively exposing the redundant gate pad and the redundant data pad, and an opening exposing the pixel electrode. To prevent the interference of image signals applied to adjacent data lines, the semiconductor pattern exposed through the opening of the passivation layer is removed. According to the present invention, because the pixel electrode of ITO is formed before forming the data wire, and the data wire has a double-layered structure including the lower layer of material having good contact properties with ITO and including also the upper layer of material having a low resistivity, wire damage and wire severance problems are prevented.

22 Claims, 20 Drawing Sheets

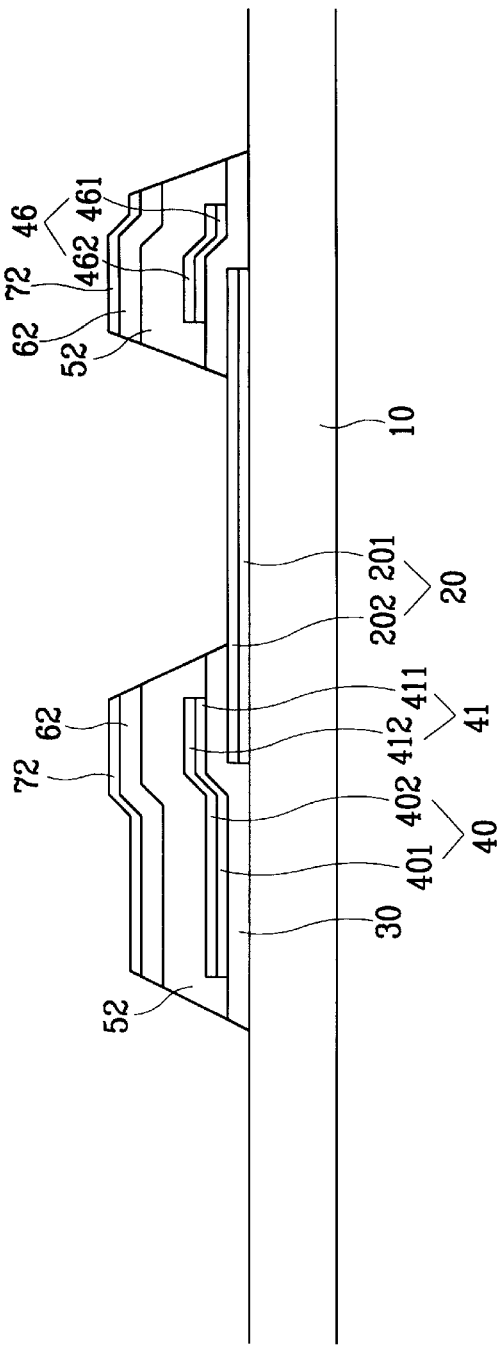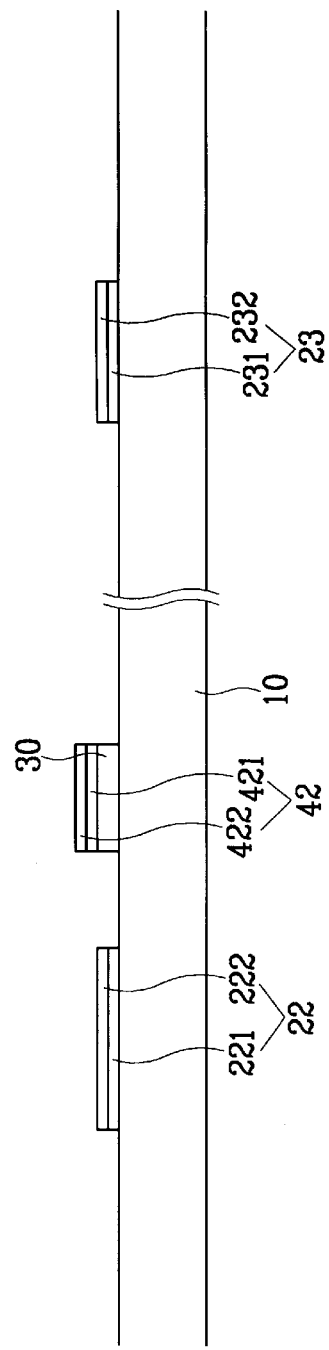
FIG.6B
FIG.6C

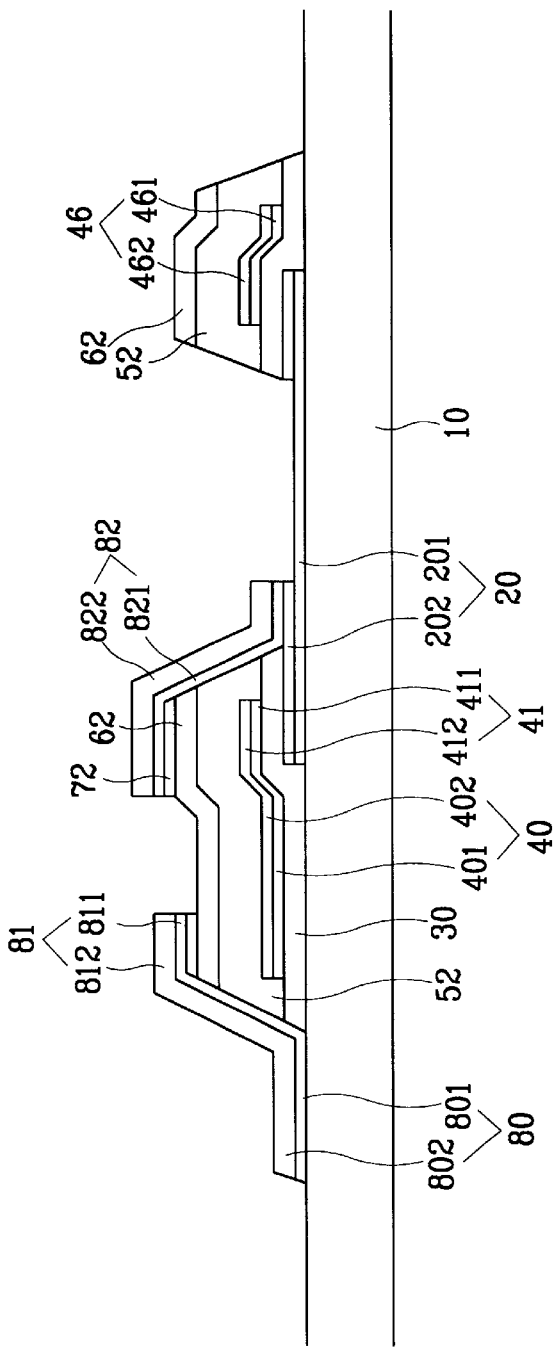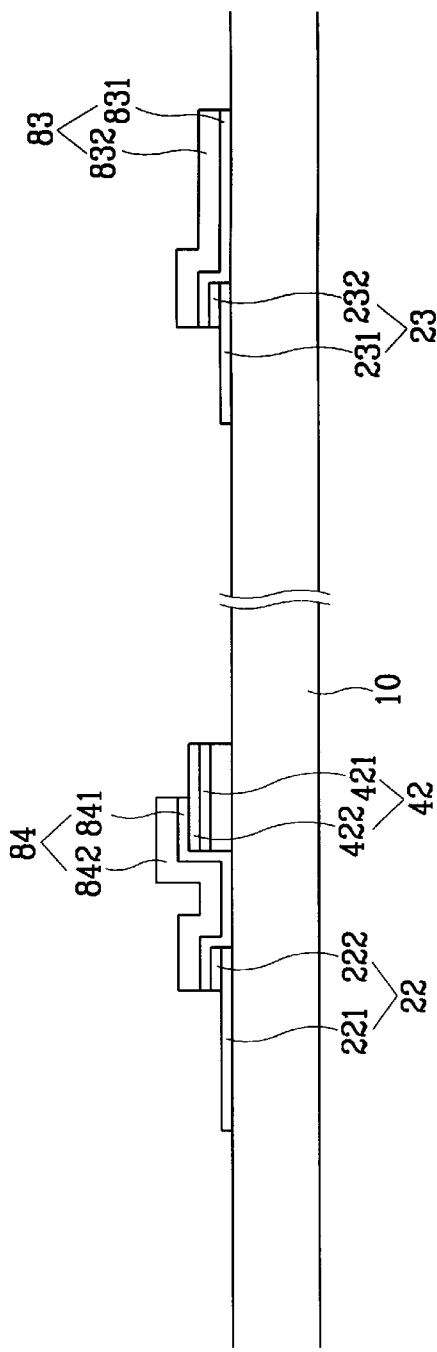
FIG.7B
FIG.7C

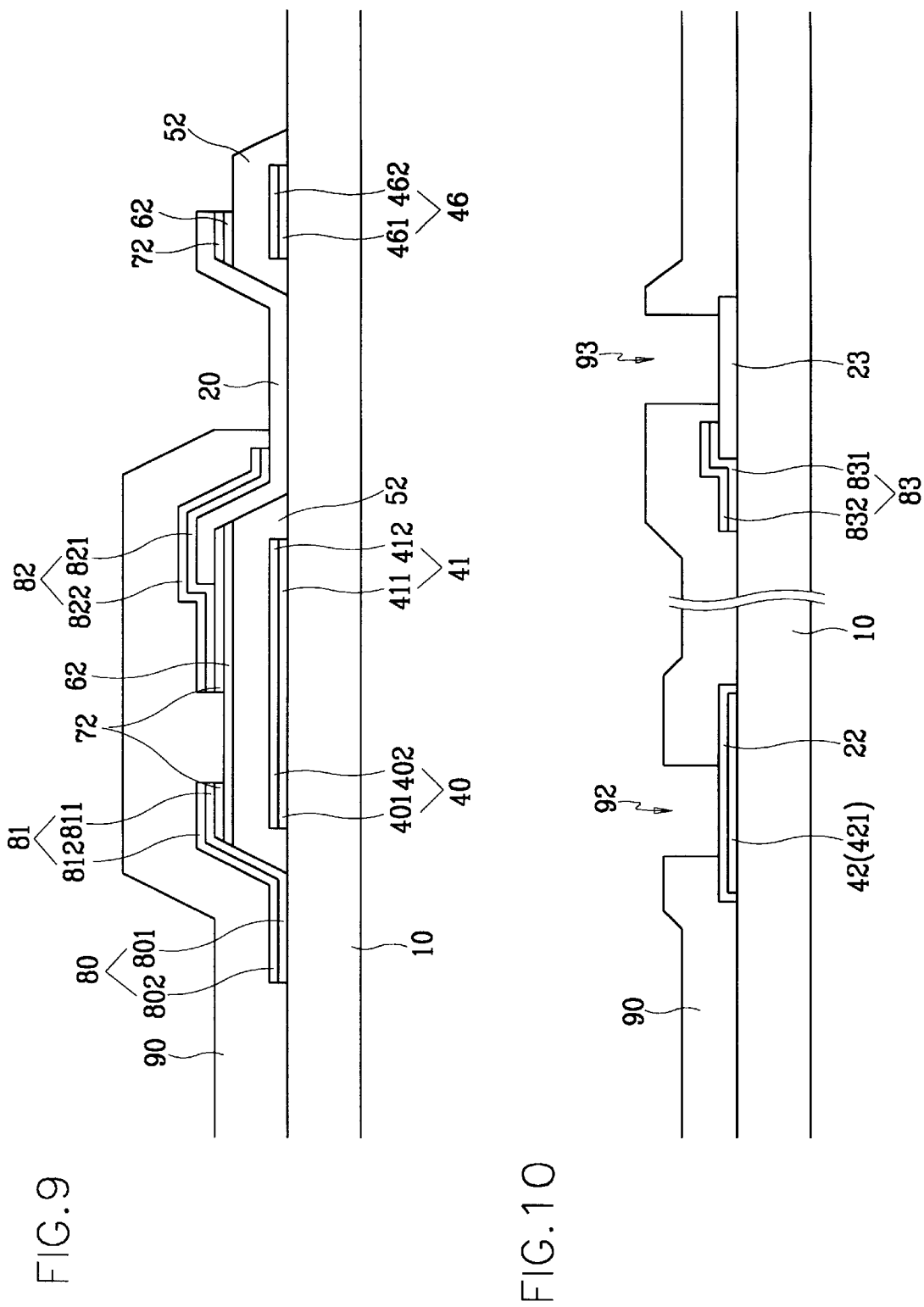

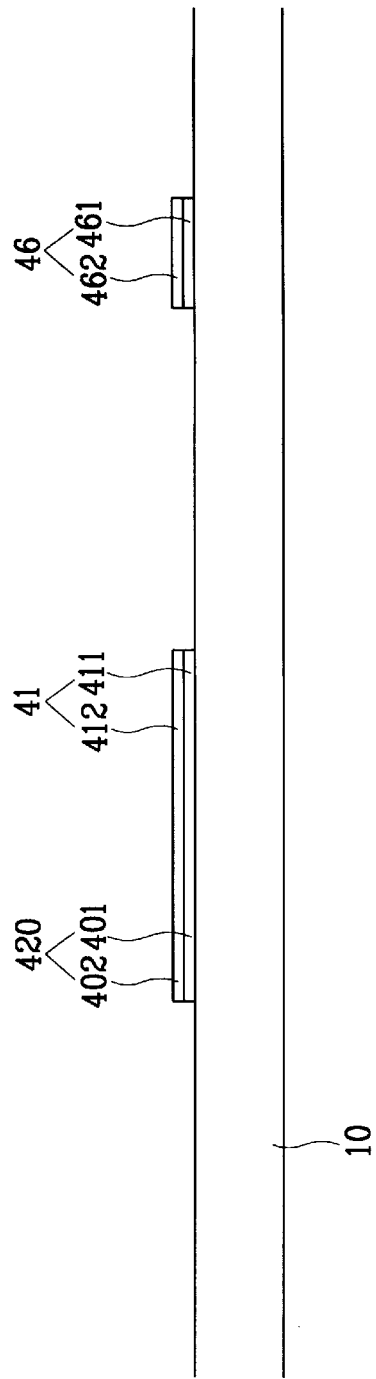
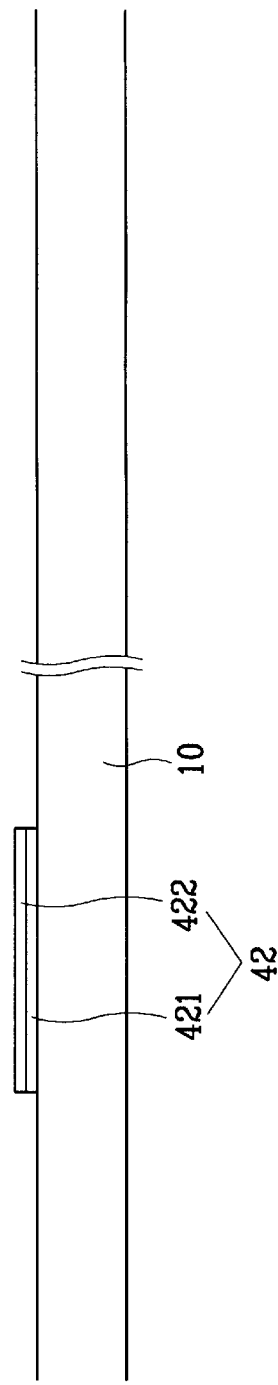
FIG.11B
FIG.11C

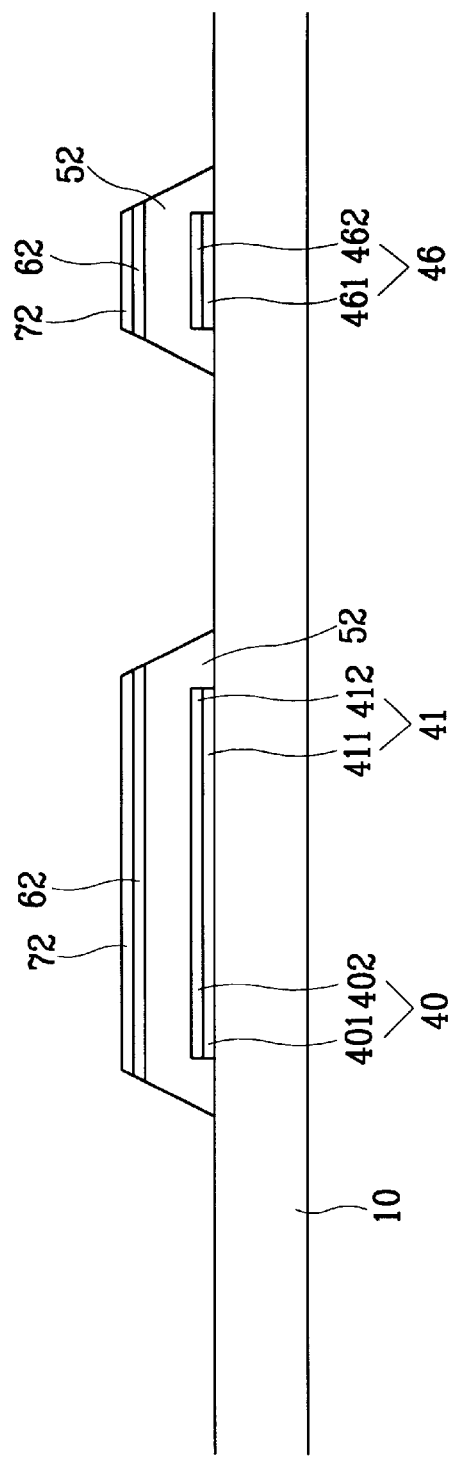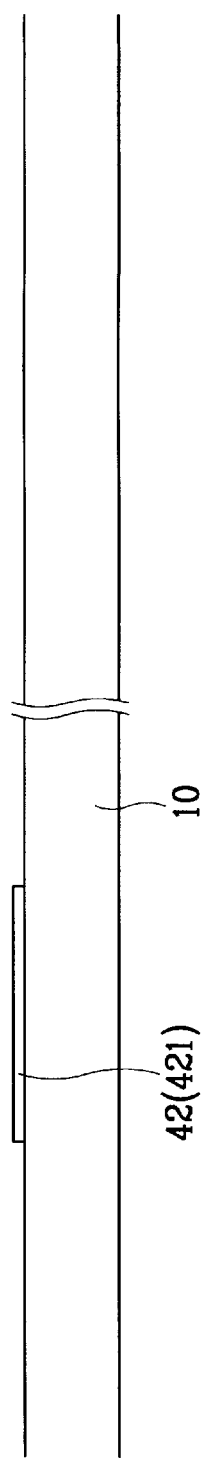

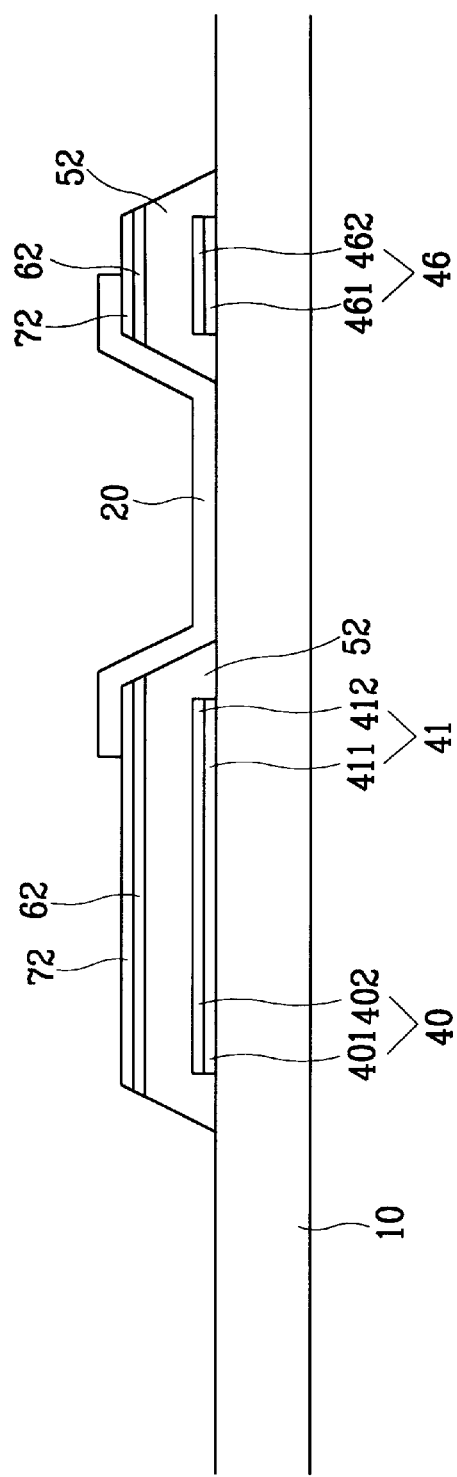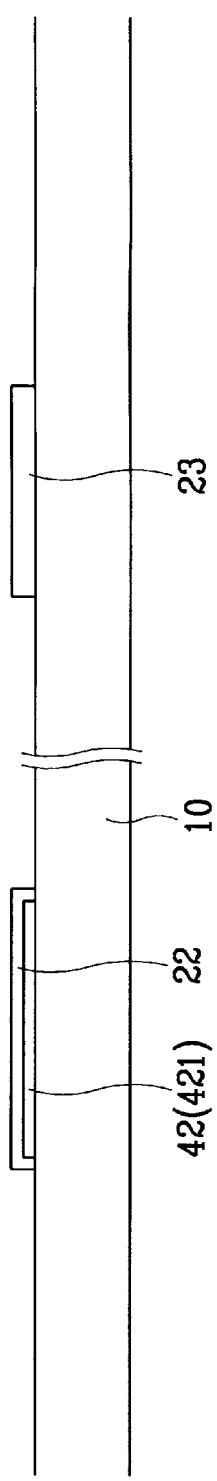

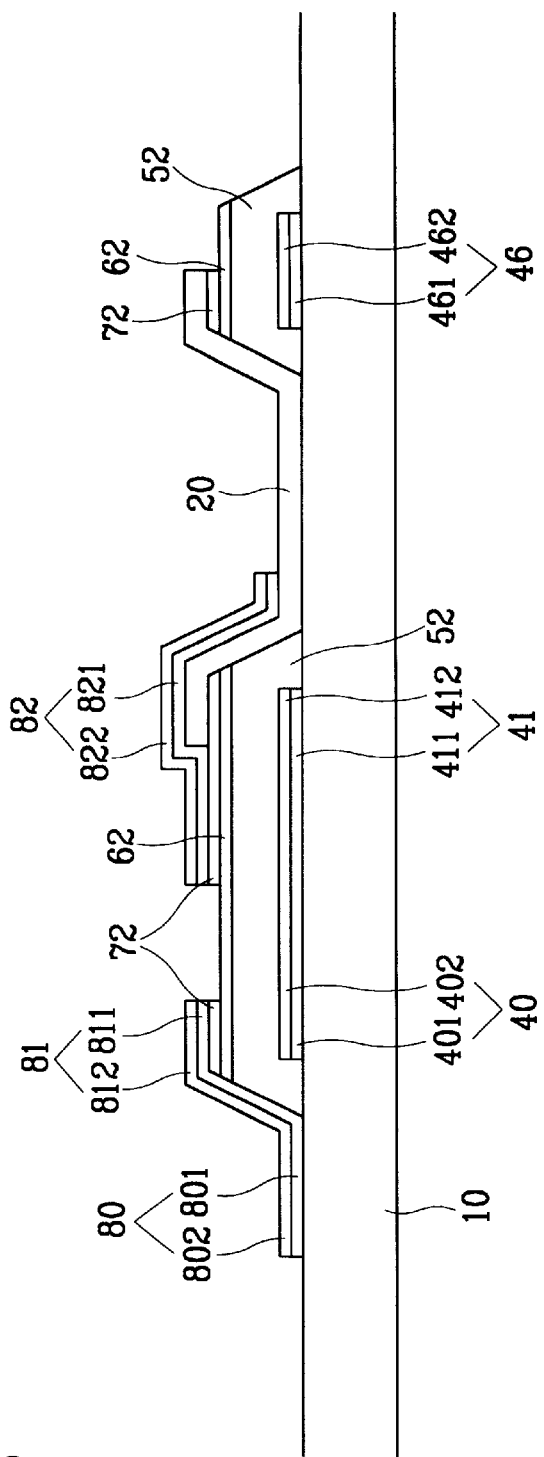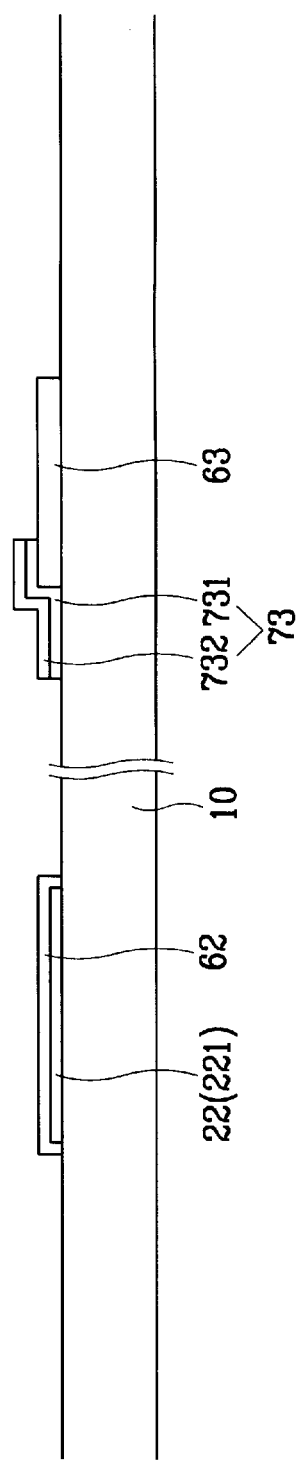
FIG.14B
FIG.14C

THIN FILM TRANSISTOR ARRAY PANEL FOR A LIQUID CRYSTAL DISPLAY HAVING A WIDE VIEWING ANGLE AND A METHOD FOR MANUFACTURING THE SAME

BACKGROUND OF THE INVENTION (a) Field of the Invention

The present invention relates to a thin film transistor array panel for a liquid crystal display having a wide viewing angle and a method for manufacturing the same.

(b) Description of the Related Art

Liquid crystal displays (LCDs) typically include two substrates and a liquid crystal layer interposed between the substrates. The transmittance of light is controlled by the intensity of an electric field applied to the liquid crystal layer.

In a vertically aligned (VA) mode LCD, liquid crystal molecules take on a homeotropic orientation in which long axes of the molecules are perpendicular to the substrate. With this configuration, light is cut off almost completely in an "off" state where an electric field above a certain value is not applied to the liquid crystal layer. In a normally black mode, since brightness in the off state is extremely low, a significantly higher contrast ratio can be obtained compared to a conventional twisted nematic LCD. However, a tilt direction of the liquid crystal molecules in an "on" state, in which an electric field above a certain value is applied between the electrodes, is irregular such that a direction of the long axes of some liquid crystal molecules is identical with a polarizing direction of either an upper or lower polarizer film. In these areas, the liquid crystal molecules are unable to rotate the polarizing direction of light, thereby resulting in the blocking of light by the polarizer films. These parts of the LCD appear black, degrading picture quality.

In the meantime, in order to prevent the delay or distortion of signals applied to wires, it is desirable that materials having low resistivity such as aluminum or aluminum alloy are used. However, the aluminum or aluminum alloy is prone to oxidation or corrosion when contacting an ITO (indium tin oxide) layer used for a pixel electrode or a pad.

Furthermore, since the aluminum or aluminum alloy is easily damaged by ITO etchant, the wires made of the aluminum or aluminum alloy may be cut off. Etching the ITO layer by a dry etch method to etch ITO may eliminate this problem, but it costs more.

SUMMARY OF THE INVENTION

It is an object of the present invention to provide a thin film transistor array panel for a liquid crystal display having a wide viewing angle and a method for manufacturing the same that can prevent damaging aluminum or aluminum alloy wires by eliminating the contact between the ITO layer and the aluminum or aluminum alloy wire.

These and other objects are provided, according to the present invention, by forming a pixel electrode of ITO before forming a data. The data wire is formed of a double-layered structure, wherein the lower layer has good contacting properties with ITO and an upper layer has a low resistivity.

In another manufacturing method according to the present invention, a gate wire is formed and a pixel electrode of transparent conductive material is formed in a pixel region. Then, a data wire is formed and finally a passivation layer pattern that covers the data wire and having an opening exposing the pixel electrode is formed.

In this manufacturing method, the gate insulating layer pattern, the semiconductor pattern and the ohmic contact layer pattern are formed by a photolithography etch process using one mask, and has a shape similar to the gate wire.

The pixel electrode may be shaped having a plurality of squares with rounded corners connected to each other, or having an open pattern formed of a square shape, a sawtooth shape or a cross shape. A storage electrode of the storage wire may have various shapes.

BRIEF DESCRIPTION OF THE DRAWINGS

The accompanying drawings, which are incorporated in and constitute a part of the specification, illustrate an embodiment of the invention, and, together with the description serve to explain the principle of the invention.

FIGS. 6B and 6C are respectively cross-sectional views taken along lines VIB–VIB' and VIC–VIC' of FIG. 6A.

FIGS. 7B and 7C are respectively cross-sectional views taken along lines VIIB–VIIB' and VIIC–VIIC' of FIG. 7A.

FIGS. 9 and 10 are cross-sectional views taken along lines IX–IX' and X–X' of FIG. 8, repetively.

FIGS. 11B and 11C are cross-sectional views taken along lines XIB–XIB' and XIC–XIC' of FIG. 11A, respectively.

FIGS. 12B and 12C are cross-sectional views taken along lines XIIB–XIIB' and XIIC–XIIC' of FIG. 12A, respectively.

FIGS. 13B and 13C are respectively cross-sectional views taken along lines XIIIB–XIIIB' and XIIIC–XIIIC' of FIG. 13A, respectively.

FIGS. 14B and 14C are respectively cross-sectional views taken along lines XIVB–XIVB' and XIVC–XIVC' of FIG. 14A.

DETAILED DESCRIPTION OF THE PREFERRED EMBODIMENTS

Figure 1:
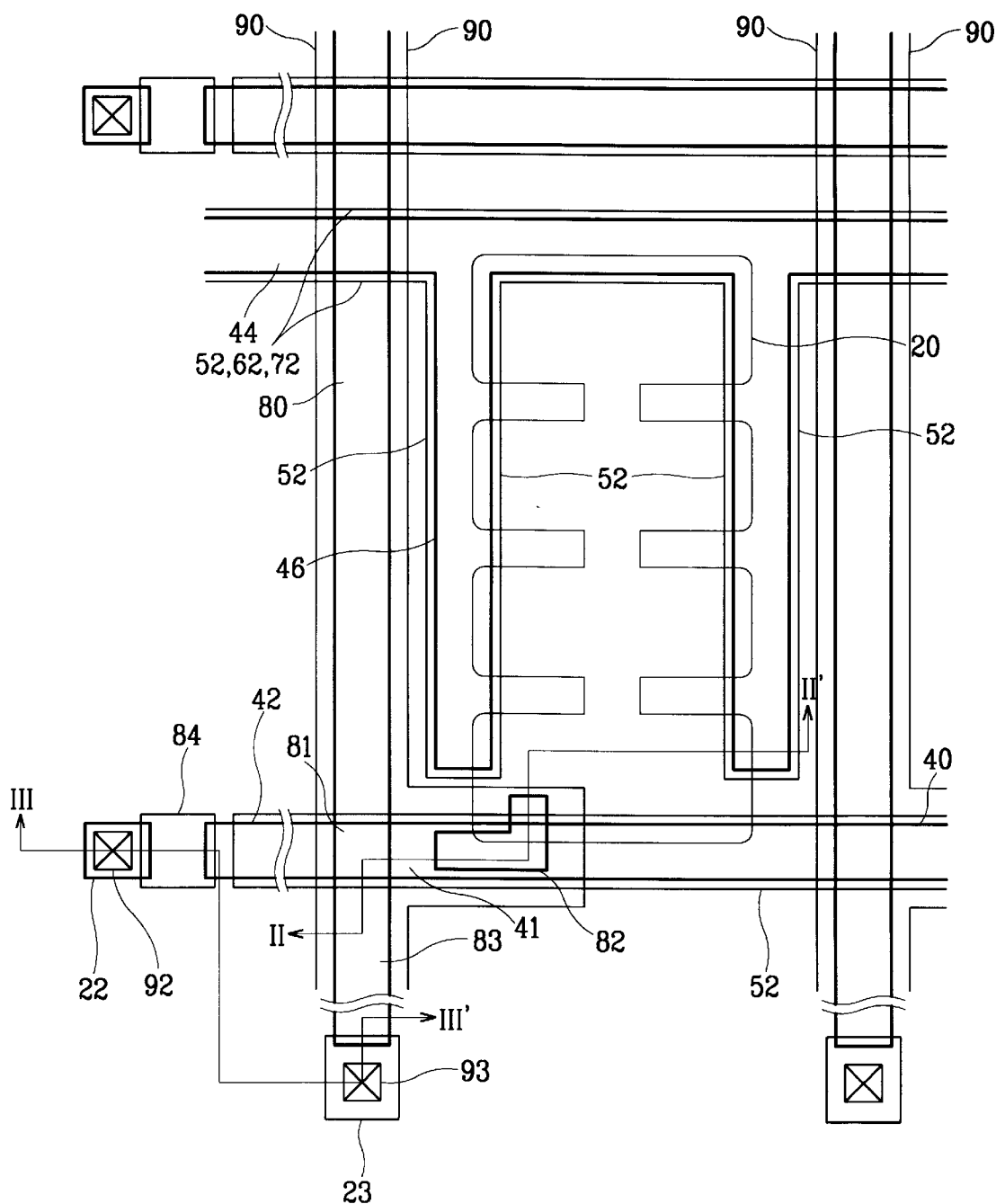
FIG. 1 is a layout view of a thin film transistor array panel for a liquid crystal display according to the first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
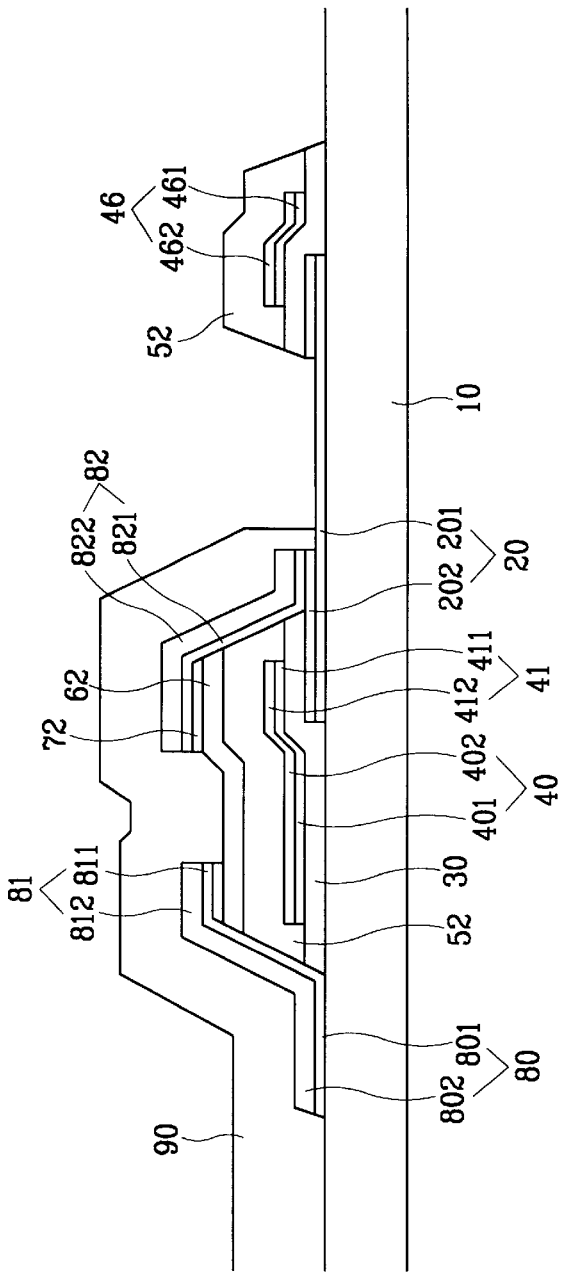
FIGS. 2 and 3 are cross-sectional views taken along lines II–II' and III–III' of FIG. 1, respectively.
Figure 3:
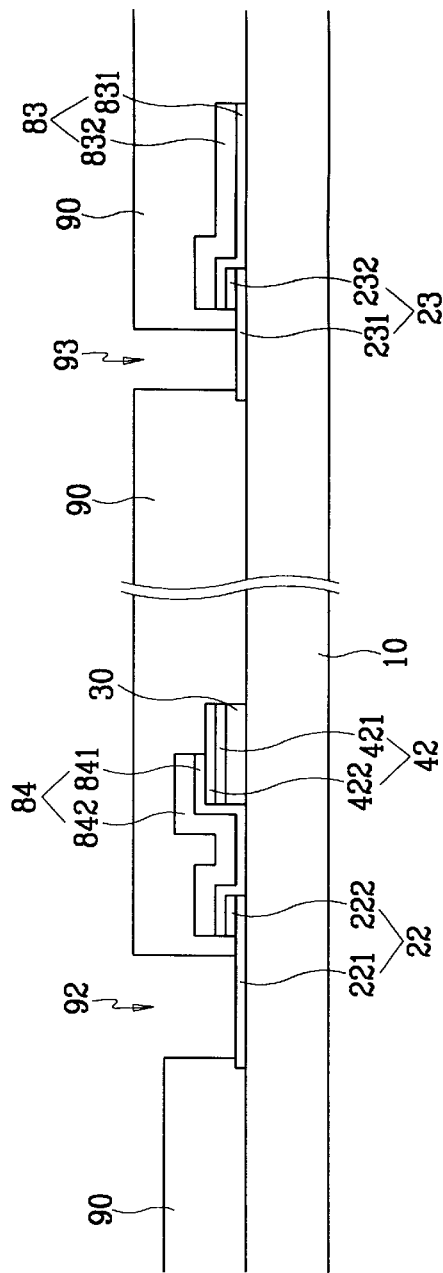

FIG. 1 is a layout view of a thin film transistor array panel for a liquid crystal display according to the first embodiment of the present invention, and FIGS. 2 and 3 are cross-sectional views taken along lines II–II' and III–III' of FIG. 1, respectively.

A pixel electrode 20, which has a plurality of connected squares with rounded corners, is formed on an insulating substrate 10 in a pixel region. To enhance a wide viewing angle of the LCD, it is desirable that liquid crystal molecules are aligned in a multi-domain configuration. To obtain such a structure, the pixel electrode 20 may have various pixel patterns. Here, although the pixel electrode 20 is illustrated to have a plurality of connected squares, the pixel electrode 20 may have an opening pattern in a square shape, a saw-tooth shape or a cross shape so that it can align liquid crystal molecules in a multi-domain configuration. To achieve the best viewing angle, it is desirable that a unit pixel is divided into four domains. To achieve a best multi-domain alignment, it is desirable to avoid disinclination or uneven texture except at a boundary of the multi-domain regions. It is also preferable that directors of the liquid crystal molecules in the neighboring domains are arranged perpendicularly. The pixel electrodes 20 may be made of ITO (indium tin oxide) for a transmission-type LCD; and of aluminum (Al), having a high reflection ratio, for a reflection-type LCD.

In this embodiment, the pixel electrode 20 has a double-layered structure that includes a lower layer 201 made of ITO and an upper layer 202 made of opaque material such as chromium. Here, the opaque upper layer 202, which is added for using as an alignment key in the manufacturing process, may be omitted. Formed on the same layer as the pixel electrode 20 are a first redundant gate pad 22 and a redundant data pad 23. Each of the first redundant gate pad 22 and the redundant data pad 23 has a double-layered structure including a lower layer 221 and 231, respectively, and an upper layer 222 and 232, respectively. The first redundant gate pad 22 and the redundant data pad 23 are optional as they strengthen the adhesion between an external drive circuit and pads.

An interlayer insulating film pattern 30 covering part of the pixel electrode 20 is formed on the insulating substrate 10. The interlayer insulating film pattern 30 is almost completely removed on a pad portion on which the first redundant gate pad 22 and the redundant data pad 23 are formed. A gate wire and a storage wire are formed on the interlayer insulating film pattern 30. The gate wire includes a gate line (or scanning signal line) 40, a gate pad 42 and a gate electrode 41. The gate line 40 extends in the horizontal direction and transmits a scanning signal. The gate pad 42 is connected to an end of the gate line 40 and located next to the redundant gate pad 22. The gate electrode 41 is a part of a thin film transistor and connected to the gate line 40. The storage wire includes a storage line 44 and a storage electrode 464. The storage line 44 is parallel with the gate line 40 and is separated from the gate line 40. The storage electrode 46 is extended in the vertical direction and are branched from the storage line 44.

The storage electrodes 46 provide storage capacitance along with the pixel electrode 20 via the interlayer insulating film pattern 30. The storage electrodes 46 may cross the center of the pixel electrode 20 in a vertical direction, and may have a plurality of projecting parts with a diamond shape at a uniform interval. The storage line 44 and the storage electrodes 46 generally receive a voltage such as a common voltage applied to a common electrode (not shown) on the upper panel of a liquid crystal display, but may also receive an independent voltage. It is possible to omit the storage electrode 46 if the storage capacitance between the pixel electrode 20 and the storage line 44 is sufficient. Here, the gate wire 40, 41 and 42, and the storage wire 44 and 46 have a double-layered structure including a lower layer 401, 411, 421 and 461 made of chromium, and an upper layer 402, 412, 422 and 462 made of aluminum. The gate wire 40, 41 and 42, and the storage wire 44 and 46 may be made of a multi-layered structure as well as a single-layered structure of metal or conductive material such as aluminum (Al) or aluminum alloy, molybdenum (Mo) or molybdenum alloy, chromium (Cr), titanium (Ti) and tantalum (Ta). When the gate wire 40, 41 and 42, the storage wire 44 and 46 are formed of a multi-layered structure, it is preferable that one layer is made of a material having a low resistivity and another layer is made of a material having good contact properties with other materials.

A gate insulating layer pattern 52 covering the gate wire 40 and 41 (except the gate pad 42), and the storage wire 44 and 46 is formed on the interlayer insulating film pattern 30. A semiconductor pattern 62 and an ohmic contact layer pattern 72 are sequentially formed thereon. The gate insulating layer pattern 52, the semiconductor pattern 62 and the ohmic contact layer pattern 72 have similar patterns. As shown in FIGS. 2 and 3, the interlayer insulating film pattern 30 except a portion under the gate pad 42 is formed in a shape identical to the gate insulating layer pattern 52.

A data wire including a data line 80, a source electrode 81 of a thin film transistor, a drain electrode 82 of the thin film transistor on the other side of the gate electrode 41, and a data pad 83 is formed on the ohmic contact layer pattern 72 and the substrate 10. The data line 80, which transmits an image signal, is extended in the vertical direction and defines a pixel region by intersecting the gate line 40. The source electrode 81 is extended to the gate electrode 41 and connected to data line 80, the drain electrode 82 is connected to the pixel electrode 20, and the data pad 83 is connected to an end of data line 80 and the redundant data pad 83 and transmits image signals from an external circuit to the data line 80. The data wire 80, 81, 82, 83 may have a multi-layered structure and various conductive materials like the gate wire 40, 41 and 42. Of course, when the data wire has a multi-layered structure, it is preferable that one layer is made of a material having a low resistivity and another is made of a material having a good contact property with other materials. Here, the data wire 81, 82, 83 has a double-layered structure including a lower layer 801, 811, 821, 831 made of chromium having a good contact property with ITO of the pixel electrode 20, and an upper layer 802, 812, 822, 832 made of aluminum having a low resistivity. A second redundant gate pad 84, which has a double-layered structure including a lower layer 841 of chromium and an upper layer 842 of aluminum, is formed on the same layer as the data wire, the second redundant gate pad 84 connecting the gate pad 42 to the first redundant gate pad 22.

Because the ohmic contact layer pattern 72 between the source electrode 81 and the drain electrode 82 is removed, the semiconductor pattern 62 is exposed therebetween.

As shown in FIGS. 2 and 3, the upper layer 202 of the pixel electrode 20, which is not covered by the data wire 81 and 82 and the gate insulating layer 52, is removed.

A passivation layer 90 is formed on the data wire 80, 81, 82, 83 and the second redundant gate pad 84, and also on the semiconductor pattern 62 and the substrate 10, which are not covered by the data wire 80, 81, 82, 83 and the second redundant gate pad 84. The passivation layer 90 is almost entirely removed except the portion on the data line 80 and thin film transistor portion, and has contact holes 92 and 93 exposing the lower layer 221 of the first redundant gate pad 22 and the lower layer 231 of the redundant data pad 23. The first redundant gate pad 22 and the redundant data pad 23 directly receive scanning signals and image signals externally.

The structure of the first embodiment achieves good contacts between an integrated drive circuit and both the first redundant gate pad 22 and the redundant data pad 23 by exposing the ITO layer of the first redundant gate pad 22 and the redundant data pad 23 through the contact holes 92 and 93. However, if the gate pad 42 and the data pad 83 are directly exposed through the contact holes 92 and 93, the first redundant gate pad 22, the second redundant gate pad 84, and the redundant data pad 23 may be omitted.

Furthermore, the ohmic contact layer and the semiconductor layer that is not covered by the passivation layer 90 are removed.

A method for manufacturing a thin film transistor array panel according to the first embodiment of the present invention will now be described with reference to the FIGS. 4A to 7C and FIGS. 1 to 3.

Figure 4A:
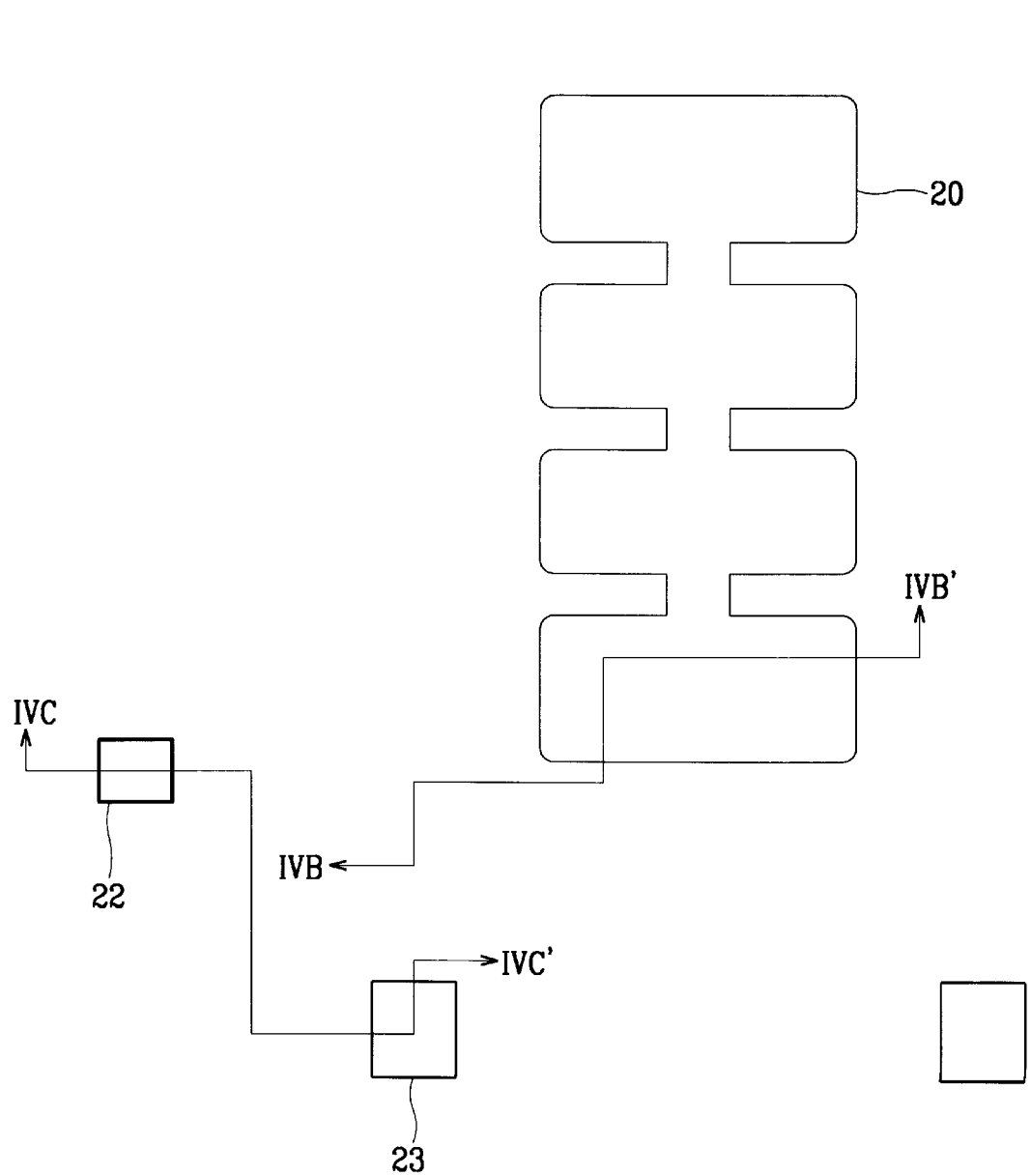
FIG. 4A is a layout view of the thin film transistor array panel according to the first embodiment of the present invention at a first manufacturing step of a first manufacturing method.
Figure 4B:
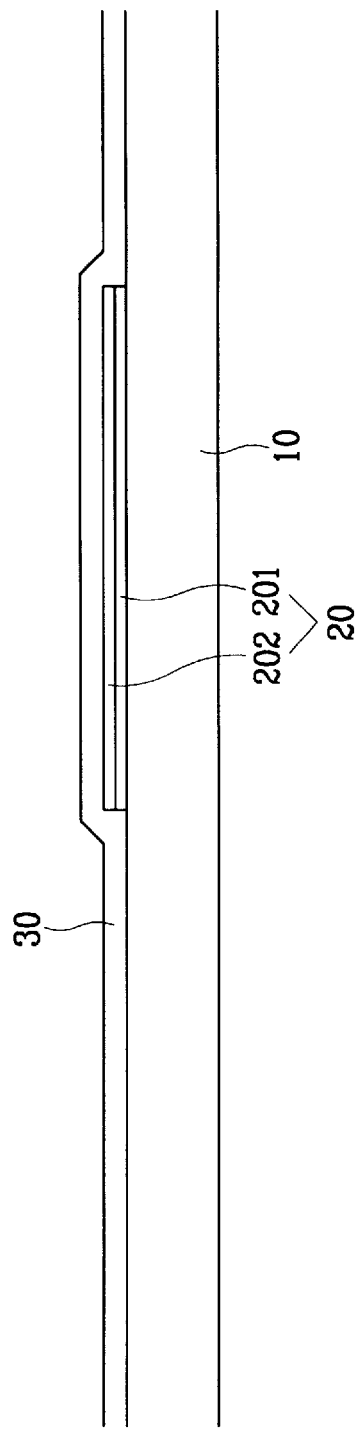
FIGS. 4B and 4C are cross-sectional views taken along lines IVB–IVB' and IVC–IVC' of FIG. 4A, respectively.
Figure 4C:
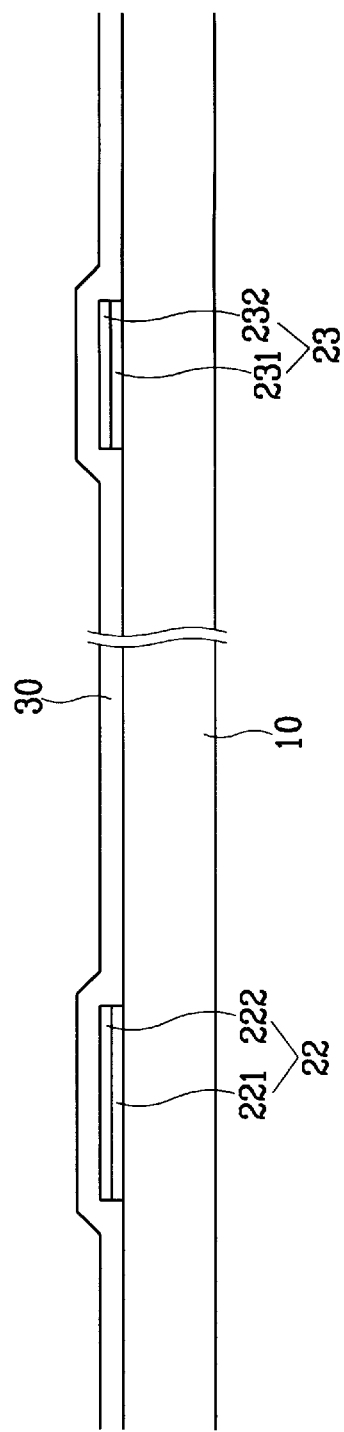

First, as shown in FIGS. 4A to 4C, a transparent conductive layer of ITO, and an opaque metal layer of chromium are sequentially deposited at a thickness of 300 to 1,000 Å on an insulating substrate 10 by a method such as sputtering or chemical vapor deposition (CVD) and patterned by a dry or wet etch method using a first mask to form a pixel electrode 20, a first redundant gate pad 22 and a redundant data pad 23 having a lower layer 201, 221 and 231, and an upper layer 202, 222 and 232. Next, an interlayer insulating film 30 made of insulating material such as silicon nitride and silicon oxide is formed. Here, the opaque upper layer 202, 222 and 232 is added as an alignment key, because the lower layer 201, 221 and 231 is transparent. Accordingly, if an opaque layer such as a signal wire and a semiconductor layer is formed before forming the pixel electrode 20, the first redundant gate pad 22 and the redundant data pad 23, the opaque upper layer 202, 222 and 232 may be omitted. At this time, to reduce manufacturing costs, it is desirable that the wet etch method is used rather than the dry etch method.

In order to enhance the wide viewing angle of the LCD by aligning liquid crystal molecules in a multi-domain configuration, the pixel electrode 20 may have various shapes of patterns that divide the pixel region. The preferred embodiment illustrates the pixel electrode 20 having a plurality of connected squares, but it is not limited to such shapes. The pixel electrode 20 may have an open pattern of a square shape, a saw-tooth shape or a cross shape.

Figure 5A:
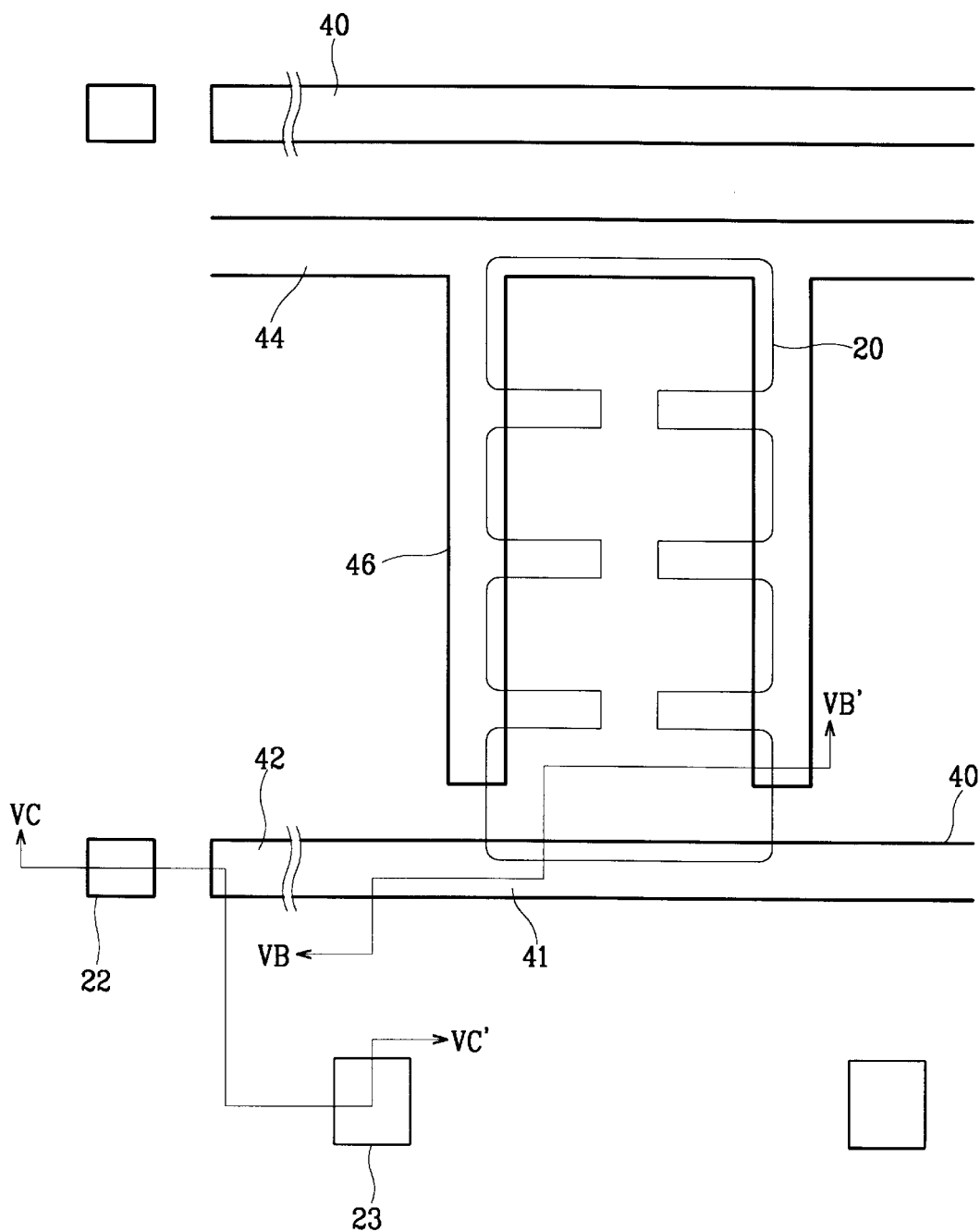
FIG. 5A is a layout view of the thin film transistor array panel at a second manufacturing step of the first manufacturing method.
Figure 5B:
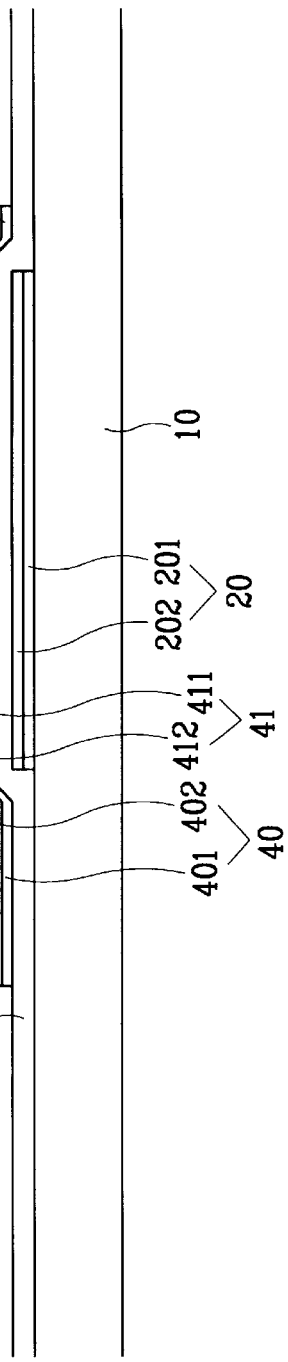
FIGS. 5B and 5C are cross-sectional views taken along lines VB–VB' and VC–VC' of FIG. 5A, respectively.
Figure 5C:
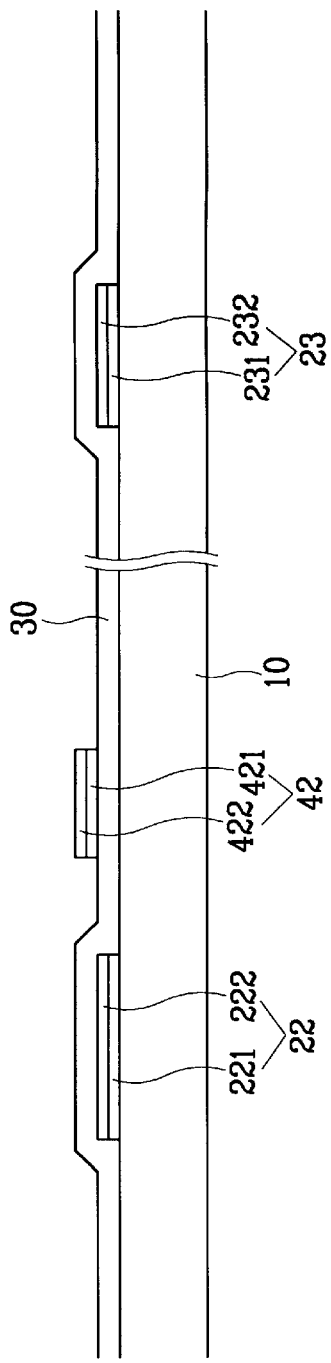

Next, as shown in FIGS. 5A to 5C, a lower layer made of chromium with a thickness of about 500 Å and an upper layer made of either aluminum or aluminum alloy with a thickness of about 2,500 Å are sequentially deposited and patterned by using one mask to form a gate wire. The gate wire includes a gate line 40, a gate electrode 41 and a gate pad 42, and a storage wire includes a storage line 44 and a storage electrode 46. Here, the gate wire 40, 41 and 42, and the storage wire 44 and 46 have a double-layered structure including a lower layer 401, 411, 421, and 461 made of chromium, and an upper layer 402, 412, 422, and 462 made of aluminum.

Figure 6A:
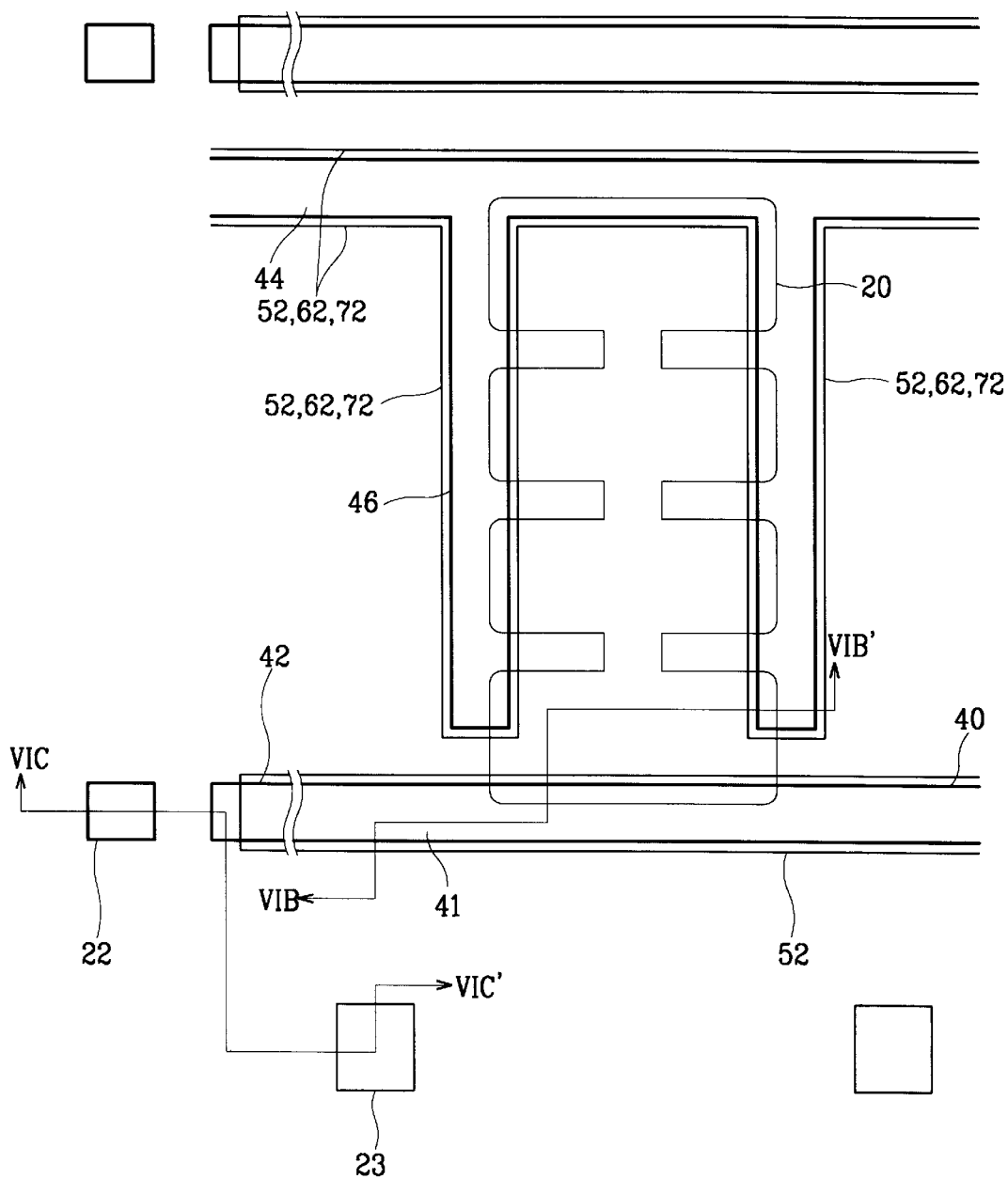
FIG. 6A is a layout view of the thin film transistor array panel at a third manufacturing step of the first manufacturing method.

Next, as shown in FIGS. 6A to 6C, a gate insulating layer 52 made of silicon nitride or silicon oxide with a thickness of about 4,500 Å, a semiconductor layer 62 made of semiconductor such as amorphous silicon with a thickness of about 2,000 Å, and an ohmic contact layer made of an amorphous silicon layer doped with N-type impurities with a thickness of about 500 Å are sequentially deposited by a method such as a chemical vapor deposition (CVD) method. The gate insulating layer 52, the semiconductor layer 62 and the ohmic contact layer 72 are patterned along with the interlayer insulating film 30 to expose the pixel electrode 20 in the pixel area. At the same time, the gate wire 40 and 41, the storage wire 44 and 46, are formed by patterning those layers.

Figure 7A:
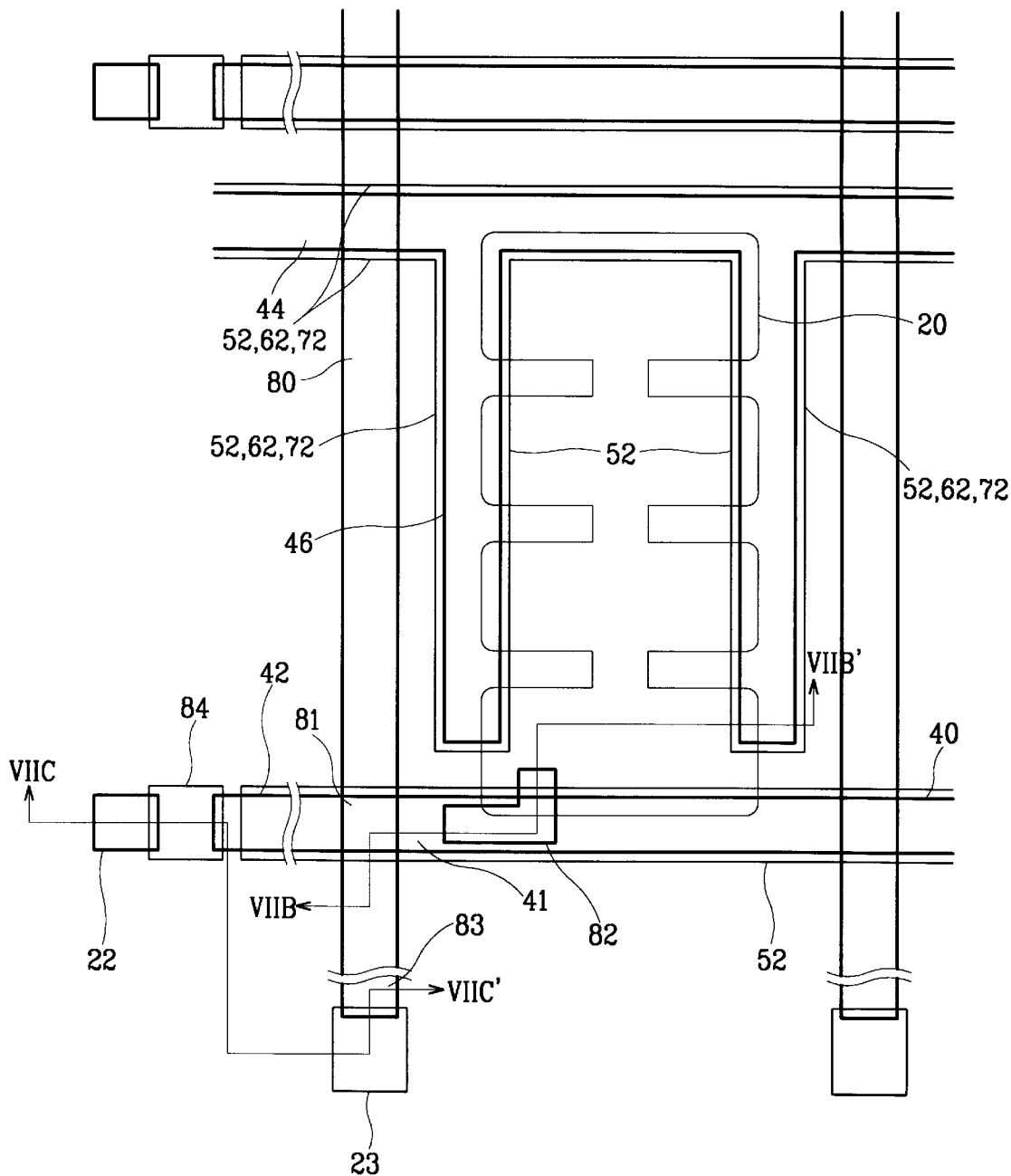
FIG. 7A is a layout view of the thin film transistor array panel at a fourth manufacturing step of the first manufacturing method.

Next, as shown in FIGS. 7A to 7C, a lower layer made of chromium with a thickness of about 500 Å and an upper layer made of either aluminum or aluminum alloy with a thickness of about 2,500 Å are sequentially deposited and patterned by using one mask to form a data wire. The data wire includes a data line 80, a source electrode 81, a drain electrode 82 and a data pad 83, and a second redundant gate pad 84. Here, the data wire 80, 81, 82 and 83, and the second redundant gate pad 84 have a double-layered structure including a lower layer 801, 811, 821, 831 and 841 made of chromium, and an upper layer 802, 812, 822, 832 and 842 made of aluminum. At this time, the chromium upper layer of the pixel electrode 20, the first redundant gate pad 22 and the redundant data pad 23 is etched out when patterning the lower chromium layer of data wire, if not covered by the aluminum upper layer 802, 812, 822, 832 and 842. Thus, the ITO lower layer 202, 222 and 232 of the pixel electrode 20, the first redundant gate pad 22 and the redundant data pad 23 is exposed. Subsequently, the ohmic contact layer 72, which is not covered by the data wire 80, 81, 82, 83 and the second redundant gate pad 84, is etched without using a mask. The semiconductor pattern 62 between the source electrode 81 and the drain electrode 82 is now exposed. Accordingly, the ohmic contact layer 72 is left remaining only under the source electrode 81 and the drain electrode 82, and on the gate line 40 intersecting the data line 80.

With reference to FIGS. 1 to 3, after forming the data wire 80, 81, 82, 83 and the second redundant gate pad 84, a passivation layer 90 with a thickness of about 3,000 Å is formed by CVD or spin coating of silicon nitride or organic insulating material, and patterned by using a mask to form contact holes 92 and 93 respectively exposing the lower ITO layer 221 and 231 of the first redundant gate pad 22 and the redundant data pad 23, and to expose the lower ITO layer 201 of the pixel electrode 20. At this time, to prevent the interference of image signals applied to the adjacent data lines 80, the semiconductor pattern 62 on the gate line 40 and the storage line 44 between the adjacent data lines 80 is removed to separate the semiconductor pattern 62 of adjacent thin film transistors. To realize this, it is desirable that the passivation layer 90 is patterned covering the data wire 80 and the portion of the thin film transistor comprising the gate electrode 41, the source electrode 81 and the drain electrode 82.

In the manufacturing method according the first embodiment described above, by forming the data wire having a double-layered structure including the lower layer made of material such as chromium having a good contact property with ITO, and the upper layer made of material having a low resistivity such as aluminum or aluminum alloy, the ITO layer does not contact the aluminum or aluminum alloy. Accordingly, the aluminum or aluminum alloy layer is not damaged. Furthermore, by forming the pixel electrode including ITO before forming the data wire including aluminum or aluminum alloy, severance of the data wire during the ITO etching is prevented. Here, materials having good contact properties with ITO include various materials such as chromium, molybdenum, molybdenum alloy, tantalum or titanium, but excluding aluminum or aluminum alloy. Furthermore, by exposing ITO through the contact holes 92 and 93, the pad portion becomes more reliable.

According to the first embodiment, the pixel electrode including ITO is formed before forming the gate wire. However, the pixel electrode may be formed after forming the gate wire. This will now be described.

Figure 8:
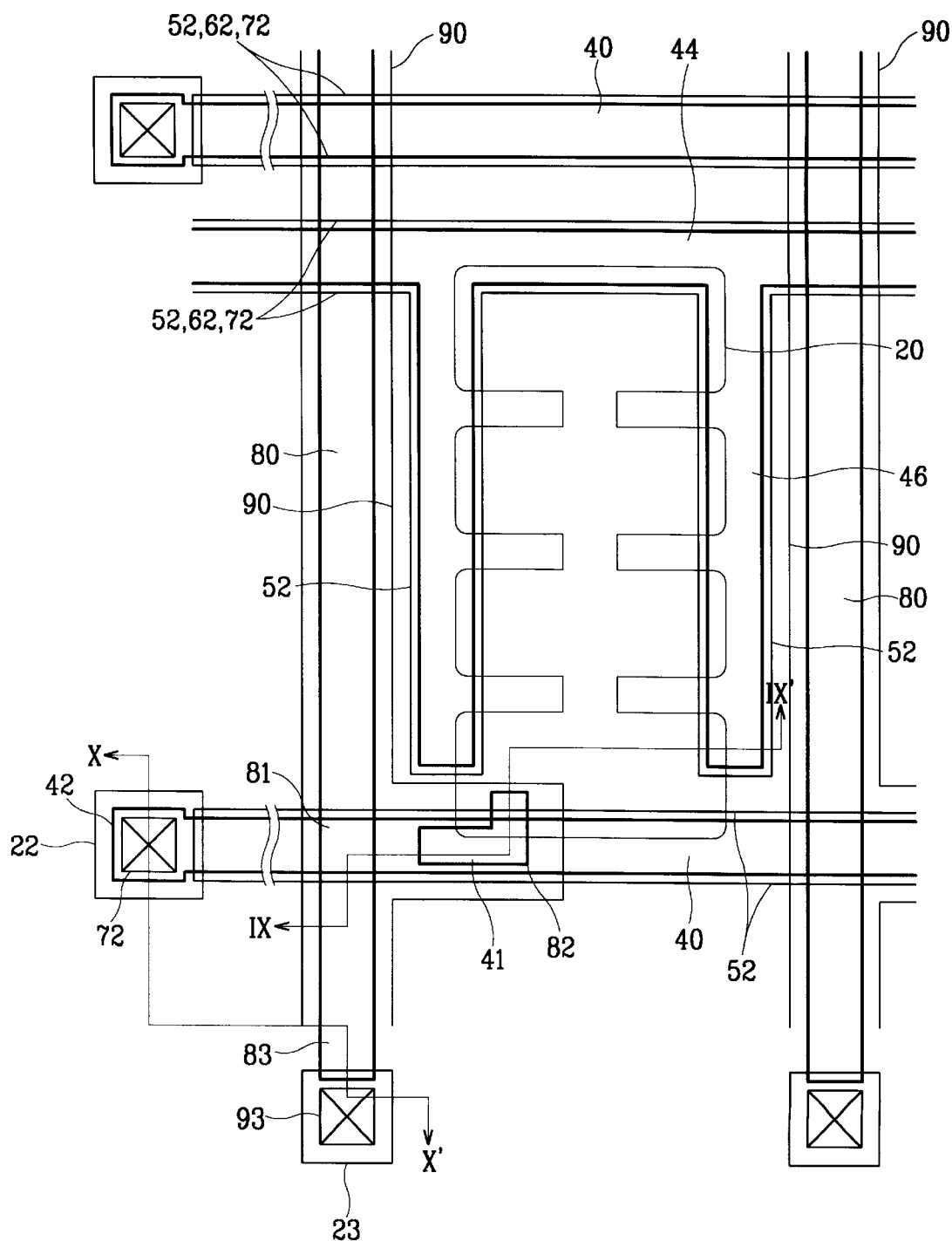
FIG. 8 is a layout view of a thin film transistor array panel for a liquid crystal display according to the second embodiment of the present invention.

FIG. 8 is a layout view of a thin film transistor array panel for a liquid crystal display according to the second embodiment of the present invention, FIGS. 9 and 10 are cross-sectional views taken along lines IX–IX' and X–X' of FIG. 1, respectively.

As shown in FIG. 8, the layout structure of a gate wire 40, 41, 42, a storage wire 44, 46, a data wire 80, 81, 82, 83, a semiconductor pattern 62, an ohmic contact layer pattern 72, a gate insulating layer pattern 52, and a passivation layer pattern 80 is similar to that of the first embodiment.

However, unlike the first embodiment, the second embodiment forms the gate wire 40, 41 and 42 directly on the insulating substrate 10, and the pixel electrode 20 having a single-layered structure made of a transparent material such as ITO is formed between the ohmic contact layer pattern 72 and the drain electrode 82, and is connected to the drain electrode 82. Furthermore, the gate pad 42 is only made of a lower layer 421, and covered by a redundant gate pad 22.

A method for manufacturing a thin film transistor array panel according to the second embodiment of the present invention will now be described with reference to the FIGS. 11A to 14C and FIGS. 8 to 10.

Figure 11A:
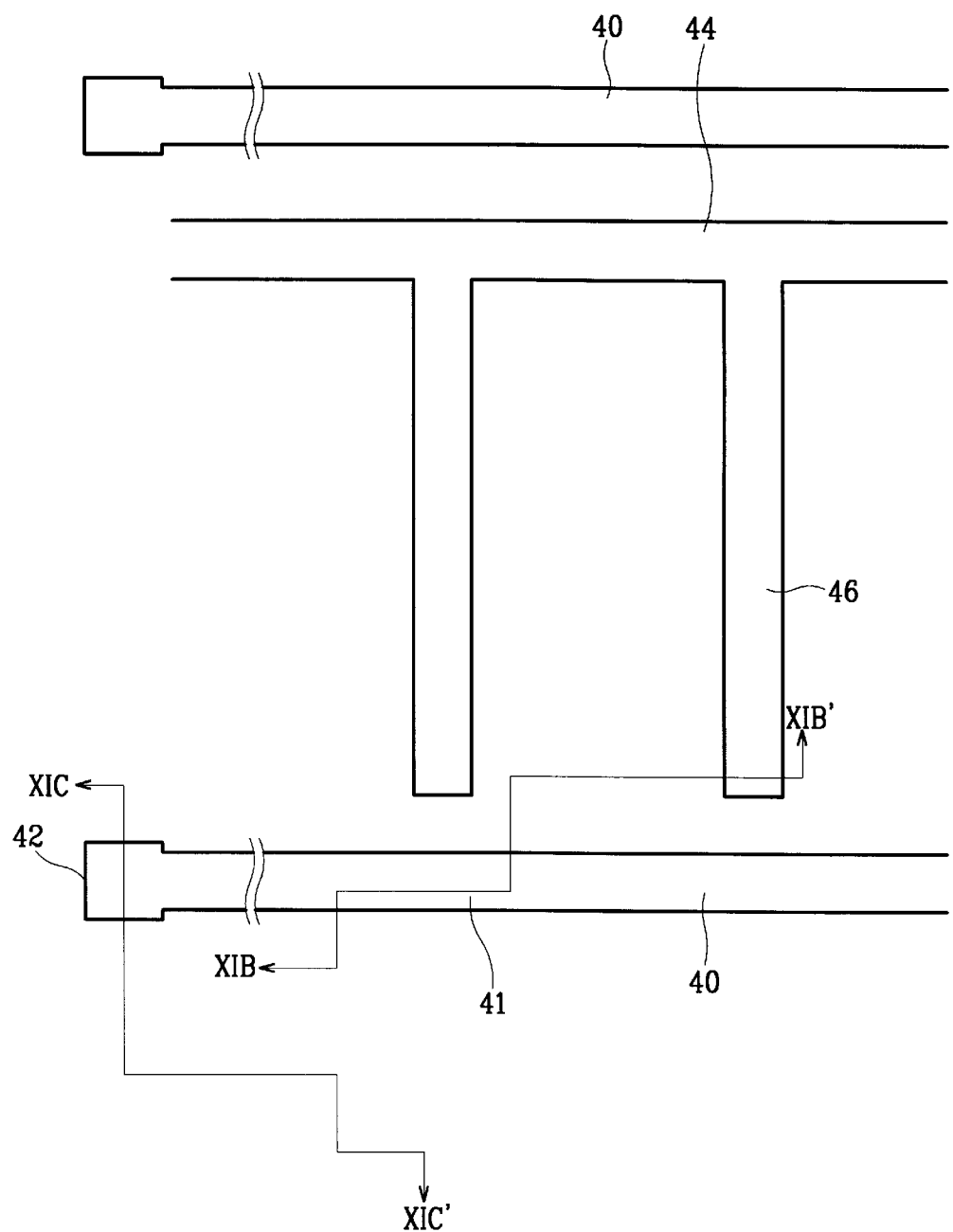
FIG. 11A is a layout view of the thin film transistor array panel according to the second embodiment of the present invention at a first manufacturing step of a second manufacturing method.

First, unlike the first embodiment, as shown in FIGS. 11A to 11C, chromium with a thickness of about 500 Å and either aluminum or aluminum alloy with a thickness of about 2,500 Å are sequentially deposited and patterned by using one mask to form a gate wire including a gate line 40, a gate electrode 41 and a gate pad 42, and a storage wire including a storage line 44 and a storage electrode 46. Here, the gate wire 40, 41 and 42, and the storage wire 44 and 46 have a double-layered structure including a lower layer 401, 411, 421 and 461 made of chromium, and an upper layer 402, 412, 422 and 462 made of aluminum.

Figure 12A:
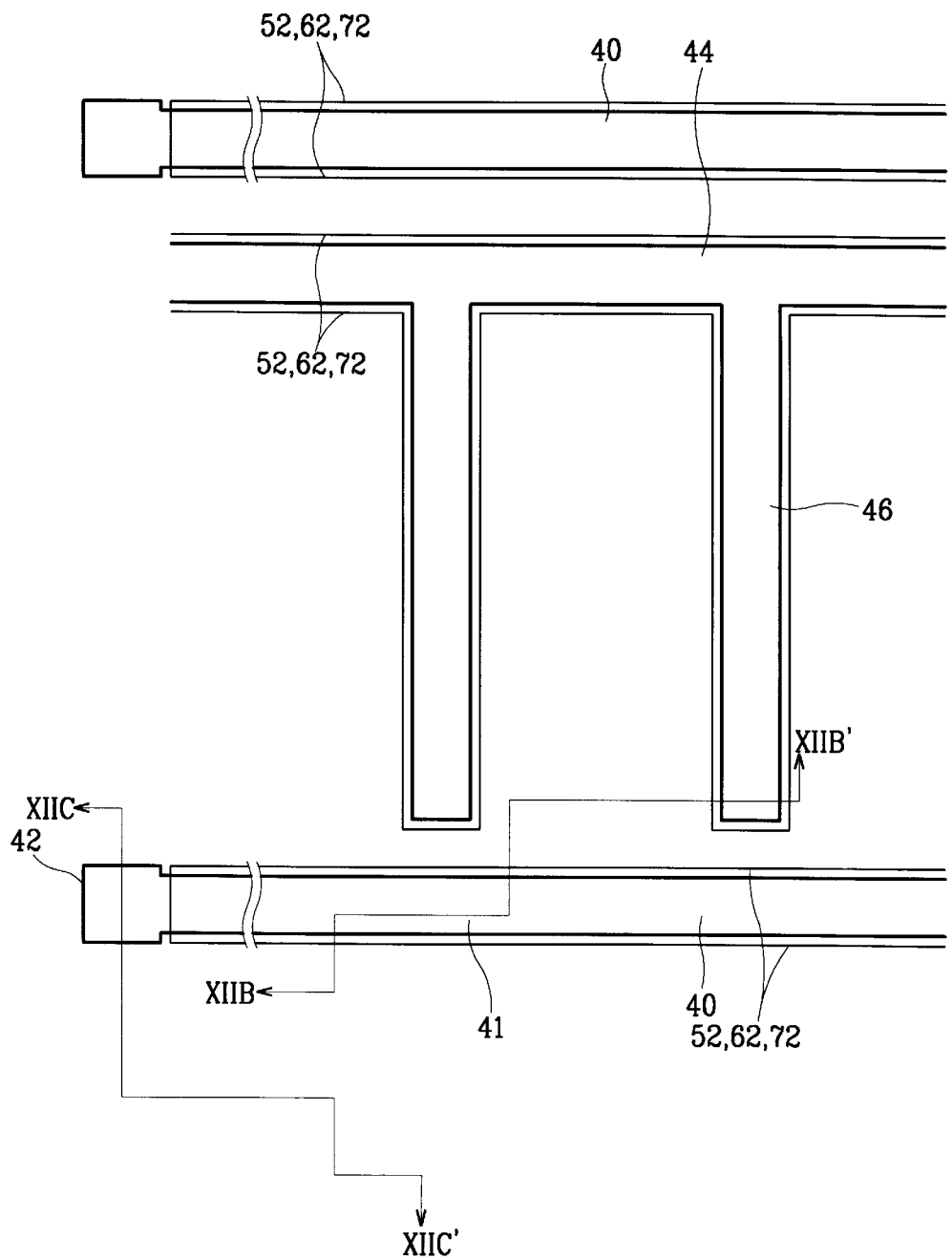
FIG. 12A is a layout view of the thin film transistor array panel at a second manufacturing step of the second manufacturing method.

Next, as shown in FIGS. 12A to 12C, a gate insulating layer 52 made of silicon nitride or silicon oxide with a thickness of about 4,500 Å, a semiconductor layer 62 made of semiconductor such as amorphous silicon with a thickness of about 2,000 Å, and an ohmic contact layer 72 made of an amorphous silicon layer doped with N-type impurities with a thickness of about 500 Å are sequentially deposited by a method such as a chemical vapor deposition (CVD) method. Then, they are patterned to form the gate insulating layer pattern 30, the semiconductor pattern 62 and the ohmic contact layer pattern 72 covering the gate wire 40 and 41, and the storage wire 44 and 46. The gate pad 42 is not covered by these layers. Next, aluminum and aluminum alloy are removed to expose the lower layer 421 of the gate pad 42.

Figure 13A:
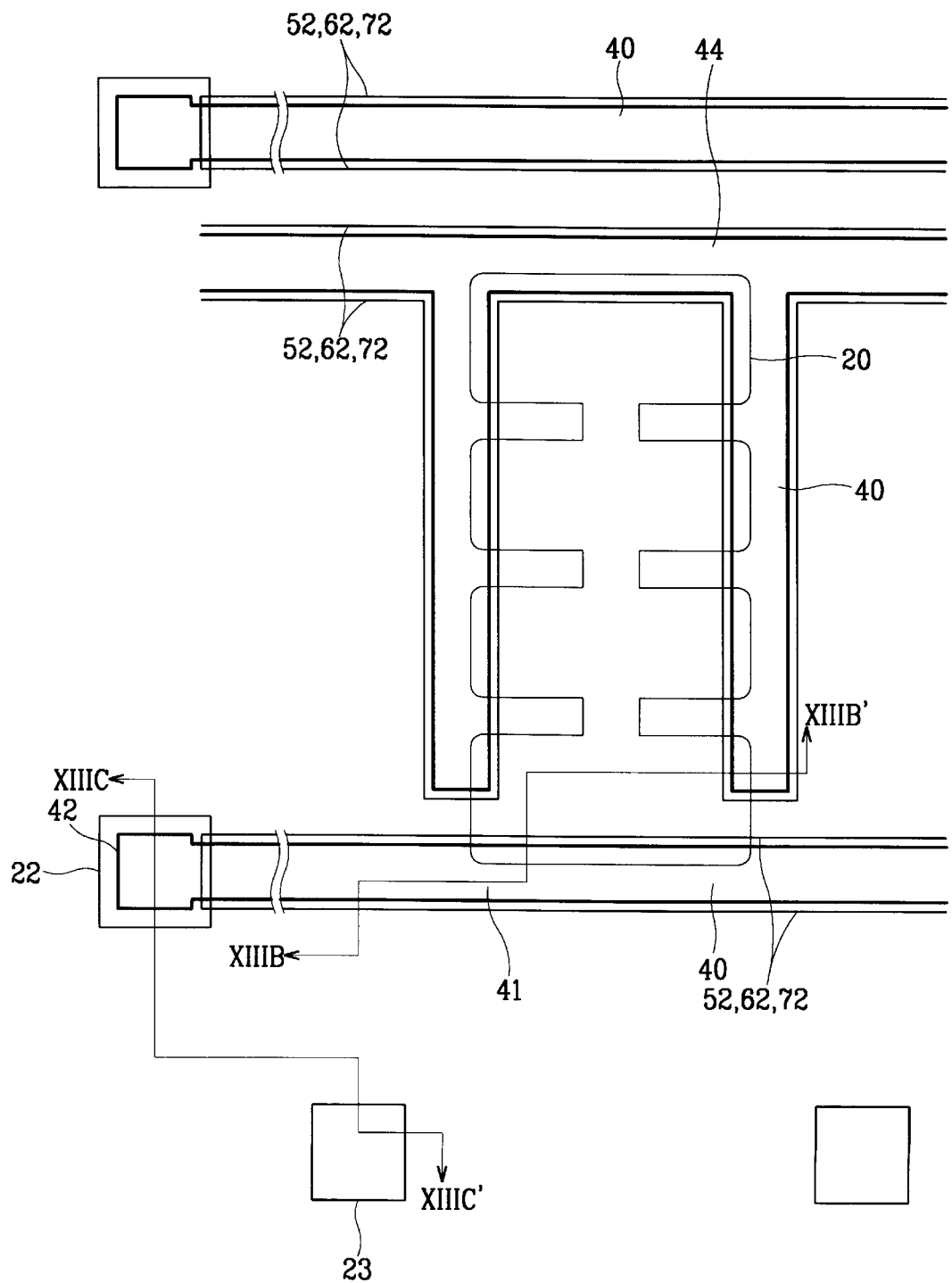
FIG. 13A is a layout view of the thin film transistor array panel at a third manufacturing step of the second manufacturing method.

Next, as shown in FIGS. 13A to 13C, a transparent conductive layer of ITO is deposited with a thickness of 300 to 1,000 on an insulating substrate 10 by a method such as sputtering. Then, it is patterned by a dry or wet etching method using one mask to form a pixel electrode 20, a redundant gate pad 22 covering the gate pad 42 and a redundant data pad 23.

Figure 14A:
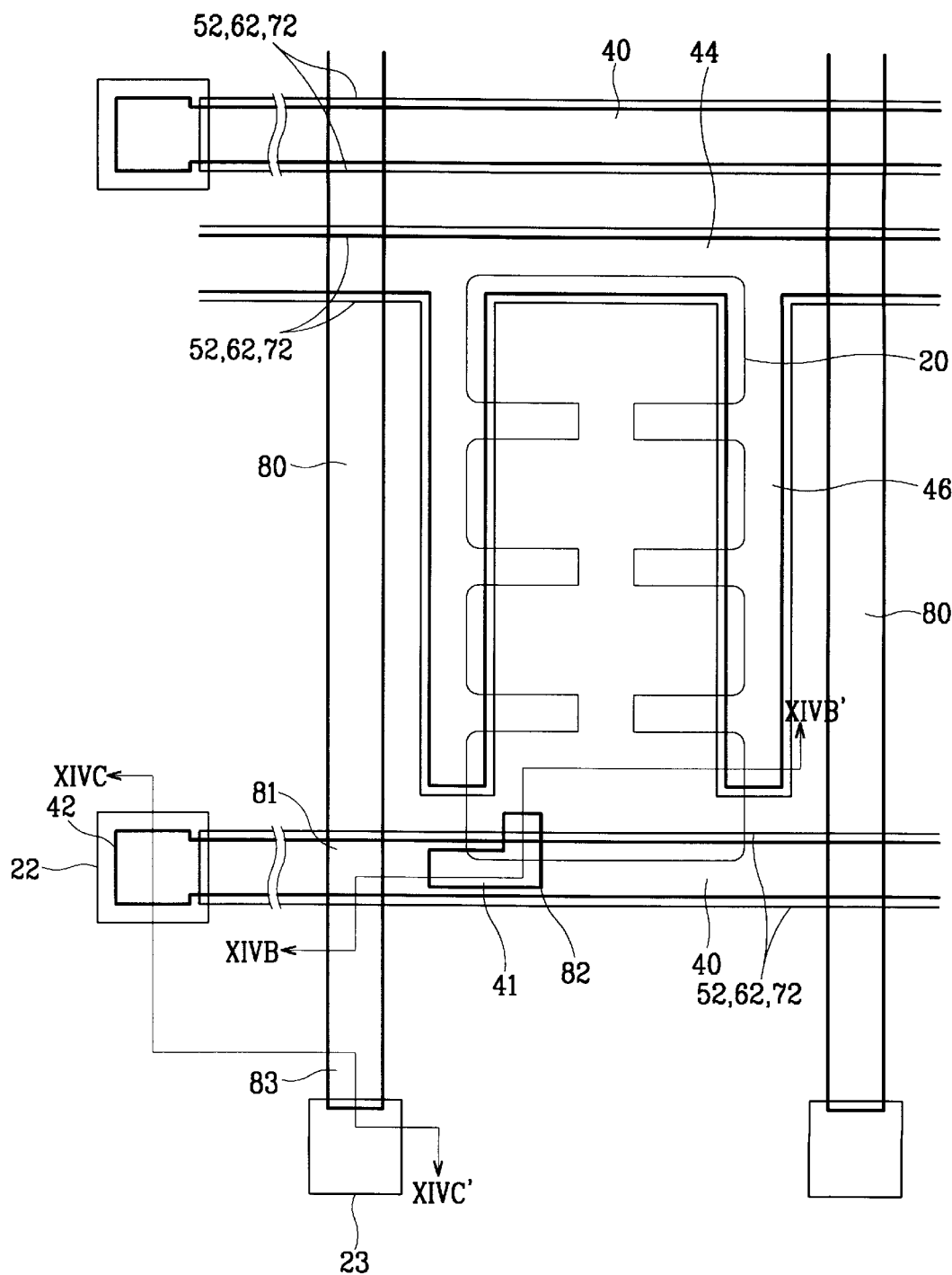
FIG. 14A is a layout view of the thin film transistor array panel at a fourth manufacturing step of the second manufacturing method.

Next, as shown in FIGS. 14A to 14C, a lower layer made of chromium with a thickness of about 500 Å and an upper layer made of either aluminum or aluminum alloy with a thickness of about 2,500 Å are sequentially deposited and patterned by using one mask to form a data wire including a data line 80, a source electrode 81, a drain electrode 82 and a data pad 83. Here, the data wire 80, 81, 82 and 83 has a double-layered structure including a lower layer 801, 811, 821 and 831 made of chromium, and an upper layer 802, 812, 822 and 832 made of aluminum. Subsequently, the ohmic contact layer 72, which is not covered by the data wire 80, 81, 82 and 83, is etched without using a mask to expose the semiconductor pattern 62 between the source electrode 81 and the drain electrode 82.

After forming the data wire 80, 81, 82 and 83, with reference to FIGS. 8 to 10, a passivation layer 90 with a thickness of about 3,000 Å is formed by CVD or spin coating of silicon nitride or organic insulating material, and patterned by using a mask to form contact holes 92 and 93 respectively exposing the redundant gate pad 22 and the redundant data pad 23, and to expose the pixel electrode 20. Also, to prevent the interference of image signals applied to the adjacent data lines 80, the semiconductor pattern 62 on the gate line 40 and the storage line 44 between the adjacent data lines 80 is removed to separate the semiconductor pattern 62 of adjacent thin film transistors.

Also, in the second embodiment, because the data wire with a double-layered structure of the lower layer of chromium having good contact properties is with ITO, and the upper layer made of aluminum or aluminum alloy of low resistivity, and the pixel electrode is formed before forming the data wire, the ITO layer does not contact aluminum or aluminum alloy. Further, it prevents the severance of the data line and the damage to the data line.

The thin film transistor substrate described above may have various structures and may be manufactured using various methods.

In the present invention, the manufacturing process of a thin film transistor panel may be used in manufacturing large-scale and high quality LCDs by using wires made of an aluminum group. In addition, damage to the wires may be prevented. Finally, the gate pad and the data pad becomes more reliable.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A method for manufacturing a thin film transistor array panel for a liquid crystal display, comprising steps of:
   forming a pixel electrode having a multi-domain pattern in a pixel region on an insulating substrate;
   forming an interlayer insulating film covering the pixel electrode on the substrate;
   forming a gate wire including a gate line and a gate electrode on the interlayer insulating film, the gate electrode being connected to the gate line;
   forming a gate insulating layer pattern covering the gate wire;
   forming a semiconductor pattern for an active area on the gate insulating layer pattern;
   forming an ohmic contact layer pattern on the semiconductor pattern;
   forming a data wire including a data line that defines the pixel region by intersecting the gate line, a source electrode connected to the data line, and a drain electrode connected to the pixel electrode, wherein the source electrode and the drain electrode are formed on the ohmic contact layer pattern and separated from each other; and
   forming a passivation layer covering the data wire, the passivation layer having an opening exposing the pixel electrode,
   wherein the interlayer insulating film is etched in the step of forming the gate insulating layer pattern, the semiconductor pattern and the ohmic contact layer pattern.

2. The method of claim 1, wherein the gate insulating layer pattern, the semiconductor pattern, and the ohmic contact layer pattern are formed in one photolithography process using one mask.

3. The method of claim 1, further comprising the step of etching the ohmic contact layer pattern that is not covered by the data wire after forming the data wire.

4. The method of claim 1, further comprising the step of etching the semiconductor pattern exposed through the opening to separate the semiconductor pattern of the adjacent pixel region, after forming the passivation layer.

5. The method of claim 1, further comprising the step of forming a storage wire overlapping the pixel electrode to form a storage capacitor, the storage wire provided on the same layer as the gate wire.

6. The method of claim 1, wherein the storage wire includes a storage line parallel the gate line, and a storage electrode connected to the storage line.

7. The method of claim 6, wherein the opening extends to the gate line and the storage line.

8. The method of claim 7, wherein the gate insulating layer pattern, the ohmic contact layer pattern, and the semiconductor pattern are covering the gate wire and storage wire.

9. The method of claim 1, wherein the pixel electrode includes ITO (indium tin oxide).

10. The method of claim 9, wherein the data wire has a double-layered structure including a lower layer of material having good contact properties such as chromium, molybdenum, molybdenum alloy, tantalum and titanium, and including an upper layer of material having a low resistivity such as an aluminum group.

11. The method of claim 10, wherein the gate wire further includes a gate pad that is connected to an external circuit and receives a signal from the same, the data wire further includes a data pad that is connected to an external circuit and receives a signal from the same, and the passivation layer has contact holes respectively exposing the gate pad and the data pad, and
   further comprising the step of forming a redundant gate pad and a redundant data pad formed on the same layer as the pixel electrode and respectively connected to the gate pad and the data pad through the contact holes.

12. The method of claim 1, wherein the pixel electrode has a plurality of connected squares with rounded corners, or an open pattern in a square shape, a saw-tooth shape or a cross shape.

13. A method for manufacturing a thin film transistor array panel for a liquid crystal display, comprising the steps of:
   forming a gate wire including a gate line and a gate electrode on an insulating substrate, the gate electrode being connected to the gate line;
   forming a gate insulating layer pattern covering the gate wire;
   forming a semiconductor pattern for an active area on the gate insulating layer pattern;
   forming an ohmic contact layer pattern on the semiconductor pattern;
   forming a pixel electrode having a multi-domain pattern in a pixel region and made of transparent material;
   forming a data wire including a data line that defines the pixel region by intersecting the gate line, a source electrode connected to the data line, and a drain electrode connected to the pixel electrode, wherein the source electrode and the drain electrode are formed on the ohmic contact layer pattern and separated from each other; and
   forming a passivation layer covering the data wire, the passivation layer having an opening exposing the pixel electrode,
   wherein the pixel electrode includes indium tin oxide, and
   wherein the data wire has a double-layered structure including a lower layer of material having good contact properties with indium tin oxide such as chromium, molybdenum, molybdenum alloy, tantalum and titanium, and including an upper layer of material having a low resistivity such as aluminum and aluminum alloy.

14. The method of claim 13, further comprising the step of forming a storage wire overlapping the pixel electrode to form a storage capacitor, the storage wire provided on the same layer as the gate wire.

15. The method of claim 14, wherein the storage wire includes a storage line parallel with the gate line, and a storage electrode connected to the storage line.

16. The method of claim 15, wherein the opening extends to the gate line and the storage line.

17. The method of claim 16, wherein the gate insulating layer pattern, the semiconductor pattern, and the ohmic contact layer pattern are formed through one photolithography process using one mask.

18. The method of claim 17, wherein the gate insulating layer pattern, the ohmic contact layer pattern, and the semiconductor pattern are covering the gate wire and storage wire.

19. The method of claim 13, further comprising the step of etching the ohmic contact layer pattern that is not covered by the data wire after forming the data wire.

20. The method of claim 13, further comprising the step of etching the semiconductor pattern that is exposed through the opening after forming the passivation layer to separate the semiconductor pattern from an adjacent pixel region.

21. The method of claim 13, wherein the gate wire further includes a gate pad that is connected to an external circuit and receives a signal from the same, the data wire further includes a data pad that is connected to an external circuit and receives a signal from the same, and the passivation layer has contact holes respectively exposing the gate pad and the data pad, and further comprising the step of forming a redundant gate pad and a redundant data pad formed on the same layer as the pixel electrode and respectively connected to the gate pad and the data pad through the contact holes.

22. The method of claim 13, wherein the pixel electrode has a plurality of connected squares with rounded corners, or an open pattern in a square shape, a saw-tooth shape or a cross shape.

* * * * *